(12) United States Patent
Chiang

(10) Patent No.: US 12,436,577 B2
(45) Date of Patent: Oct. 7, 2025

(54) ELECTRONIC DEVICE AND FLEXIBLE PEN PLUG

(71) Applicant: ASUSTeK COMPUTER INC., Taipei (TW)

(72) Inventor: Meng-Chi Chiang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 214 days.

(21) Appl. No.: 18/337,060

(22) Filed: Jun. 19, 2023

(65) Prior Publication Data

US 2024/0134422 A1 Apr. 25, 2024
US 2024/0231443 A9 Jul. 11, 2024

(30) Foreign Application Priority Data

Oct. 24, 2022 (TW) .................................. 111140183

(51) Int. Cl.
G06F 1/16 (2006.01)
(52) U.S. Cl.
CPC .................................. G06F 1/1684 (2013.01)
(58) Field of Classification Search
CPC .................................. G06F 1/1684; G06F 1/16
See application file for complete search history.

(56) References Cited

U.S. PATENT DOCUMENTS

| | | | | |
|---|---|---|---|---|
| 2006/0119569 | A1* | 6/2006 | Tsai | H04B 10/1143 345/156 |
| 2008/0169667 | A1* | 7/2008 | Siniarski | B60R 7/082 296/37.8 |
| 2016/0048218 | A1* | 2/2016 | Kim | G06F 1/1684 455/557 |
| 2021/0080998 | A1* | 3/2021 | Nakagaki | G06F 3/03545 |
| 2023/0004239 | A1* | 1/2023 | Maeda | G06F 3/03545 |
| 2024/0319766 | A1* | 9/2024 | Nishizawa | G06F 1/1607 |

FOREIGN PATENT DOCUMENTS

| | | |
|---|---|---|
| CN | 209928418 | 1/2020 |
| CN | 213582121 | 6/2021 |
| CN | 214899054 | 11/2021 |
| TW | 310913 | 7/1997 |

* cited by examiner

*Primary Examiner* — Daniel J Rohrhoff
(74) *Attorney, Agent, or Firm* — JCIPRNET

(57) ABSTRACT

An electronic device includes a casing, a flexible pen plug, and a locking member. The casing includes a pen slot and a first engaging portion located beside the pen slot. The flexible pen plug is detachably disposed in the pen slot, and includes a door portion, a second engaging portion connected to the door portion, a first wall portion close to the second engaging portion, and a second wall portion away from the second engaging portion. An insertion space is formed between the first wall portion and the second wall portion. When the flexible pen plug is disposed in the pen slot, the second engaging portion is engaged with the first engaging portion. The locking member is detachably screwed to the door portion, partially extends into the insertion space, and is located between the first wall portion and the second wall portion.

10 Claims, 5 Drawing Sheets

ELECTRONIC DEVICE AND FLEXIBLE PEN PLUG

CROSS-REFERENCE TO RELATED APPLICATION

This application claims the priority benefit of Taiwan application serial no. 111140183, filed on Oct. 24, 2022. The entirety of the above-mentioned patent application is hereby incorporated by reference herein and made a part of this specification.

BACKGROUND

Technical Field

The disclosure relates to a flexible pen plug and an electronic device.

Description of Related Art

Nowadays, some electronic devices (e.g. laptops or tablets) have a pen slot and charging cradle of the stylus reserved inside the electronic device to provide users with the flexibility to purchase stylus pens and other accessories on their own in the future. In order to keep the appearance of the electronic device intact, a rubber pen plug is traditionally used to cover the pen slot by inserting it into the hole from the outside. However, rubber plugs have a weak ability to be stuck in the pen slot and may easily fall out, or be removed by children or accidentally eaten, causing safety concerns.

SUMMARY

The disclosure provides an electronic device, which includes a casing, a flexible pen plug, and a locking member. The casing includes a pen slot and a first engaging portion located beside the pen slot. The flexible pen plug is detachably disposed in the pen slot, and includes a door portion, a second engaging portion connected to the door portion, a first wall portion close to the second engaging portion and a second wall portion away from the second engaging portion. An insertion space is formed between the first wall portion and the second wall portion, and when the flexible pen plug is disposed in the pen slot, the second engaging portion is engaged with the first engaging portion. The locking member is detachably screwed to the door portion. When the locking member is screwed to the door portion, the locking member partially extends into the insertion space, and is located between the first wall portion and the second wall portion, the locking member is limited by the second wall position, and thus the door portion secured to the locking member is limited, so that a relative position between the second engaging portion and the first engaging portion is maintained. When the locking member is moved out of the insertion space, the door portion is released from the limit, and the second engaging portion is adapted to be released from the first engaging portion.

The disclosure provides a flexible pen plug, which is adapted to be inserted into a pen slot. A first engaging portion is located beside the pen slot. The flexible pen plug includes a door portion, a second engaging portion, a first wall portion, and a second wall portion. The second engaging portion is connected to the door portion. The first wall portion is connected to the door portion and is close to the second engaging portion. The second wall portion is parallel to the first wall portion and away from the second engaging portion. The second wall portion is separated from the door portion. An insertion space is formed between the first wall portion and the second wall portion.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
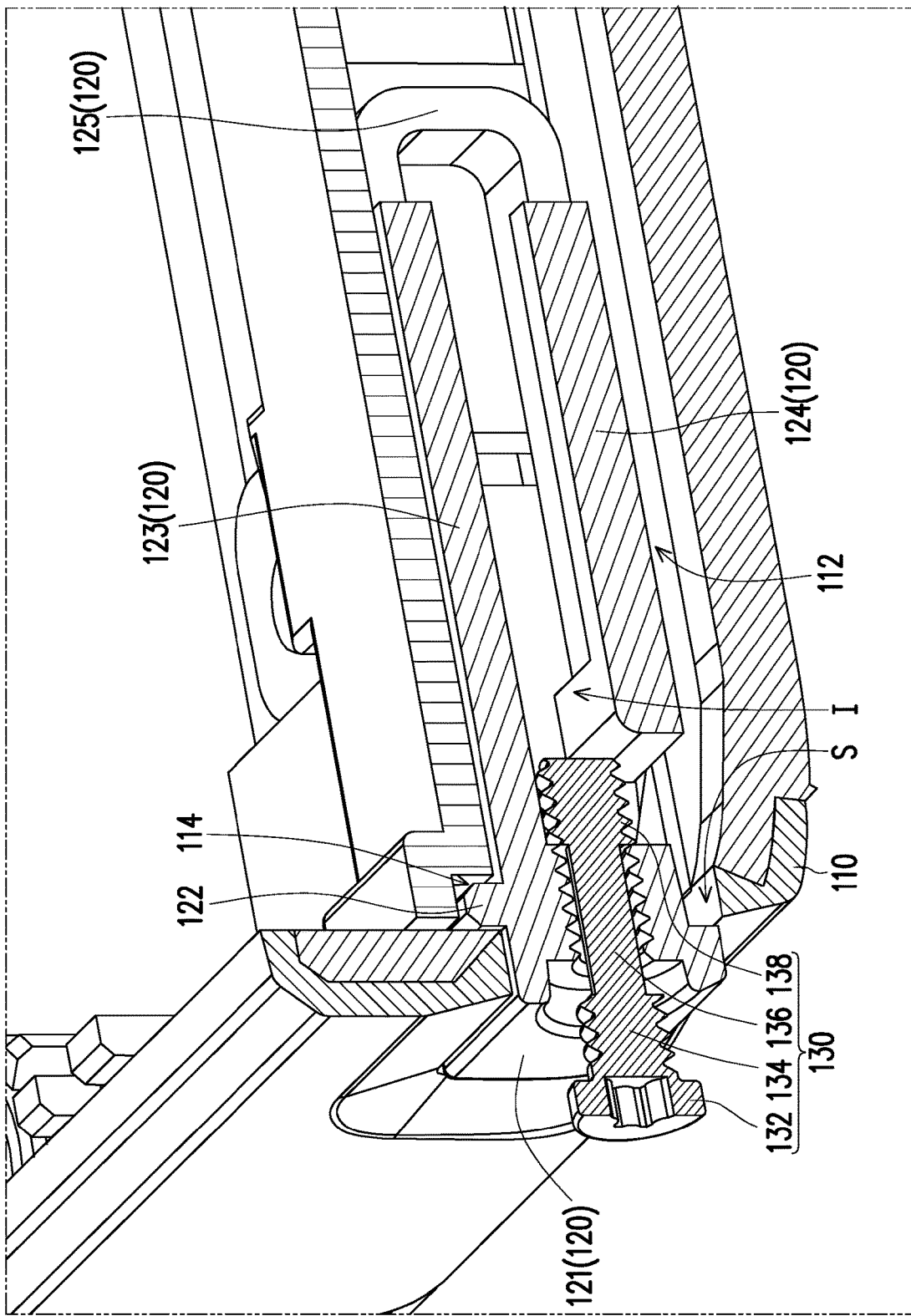
FIG. 1 is a three-dimensional schematic view of a partial cross section of an electronic device according to an embodiment of the disclosure.
Figure 2:
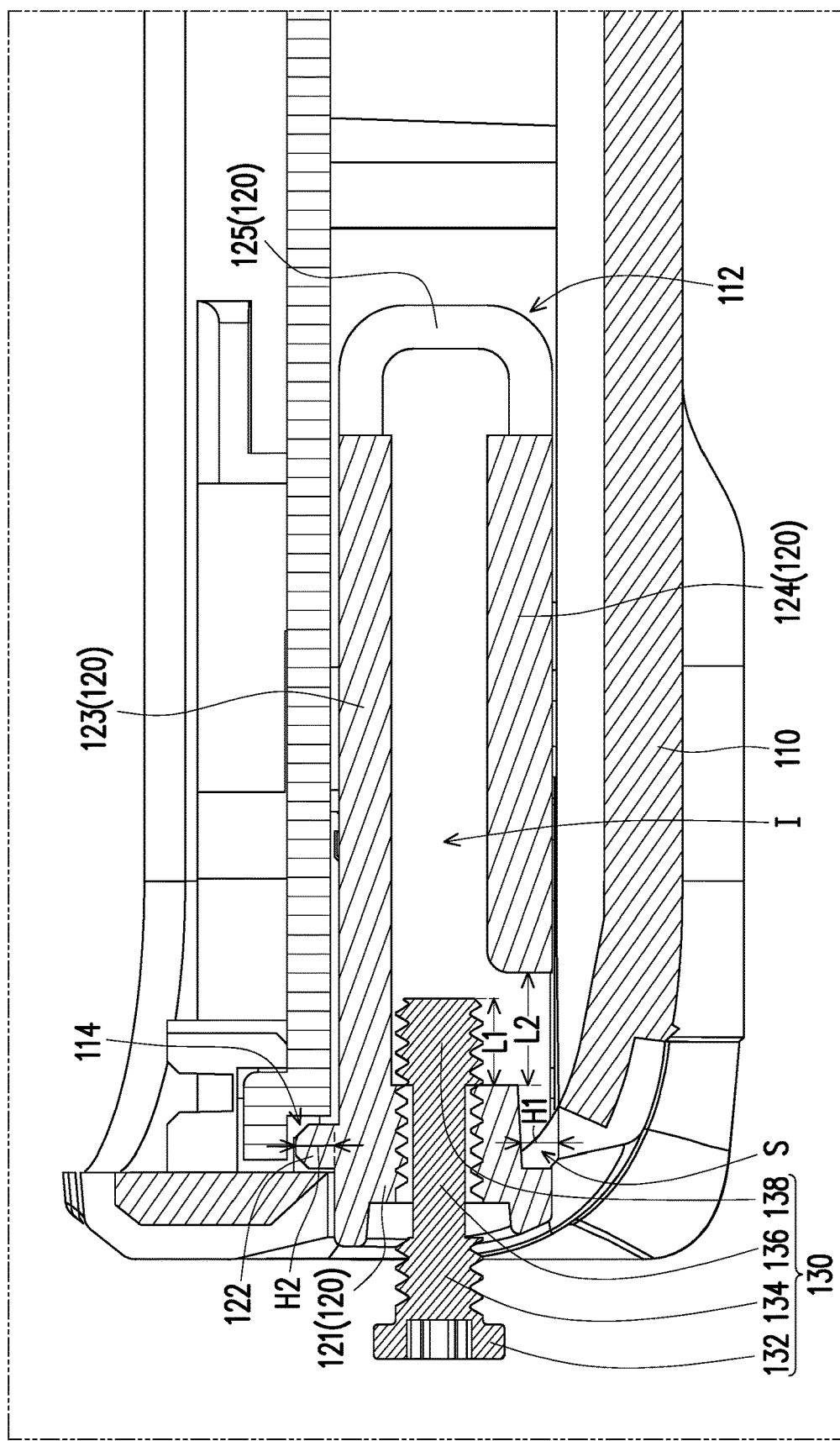
FIG. 2 is a schematic side view of FIG. 1.
Figure 3:
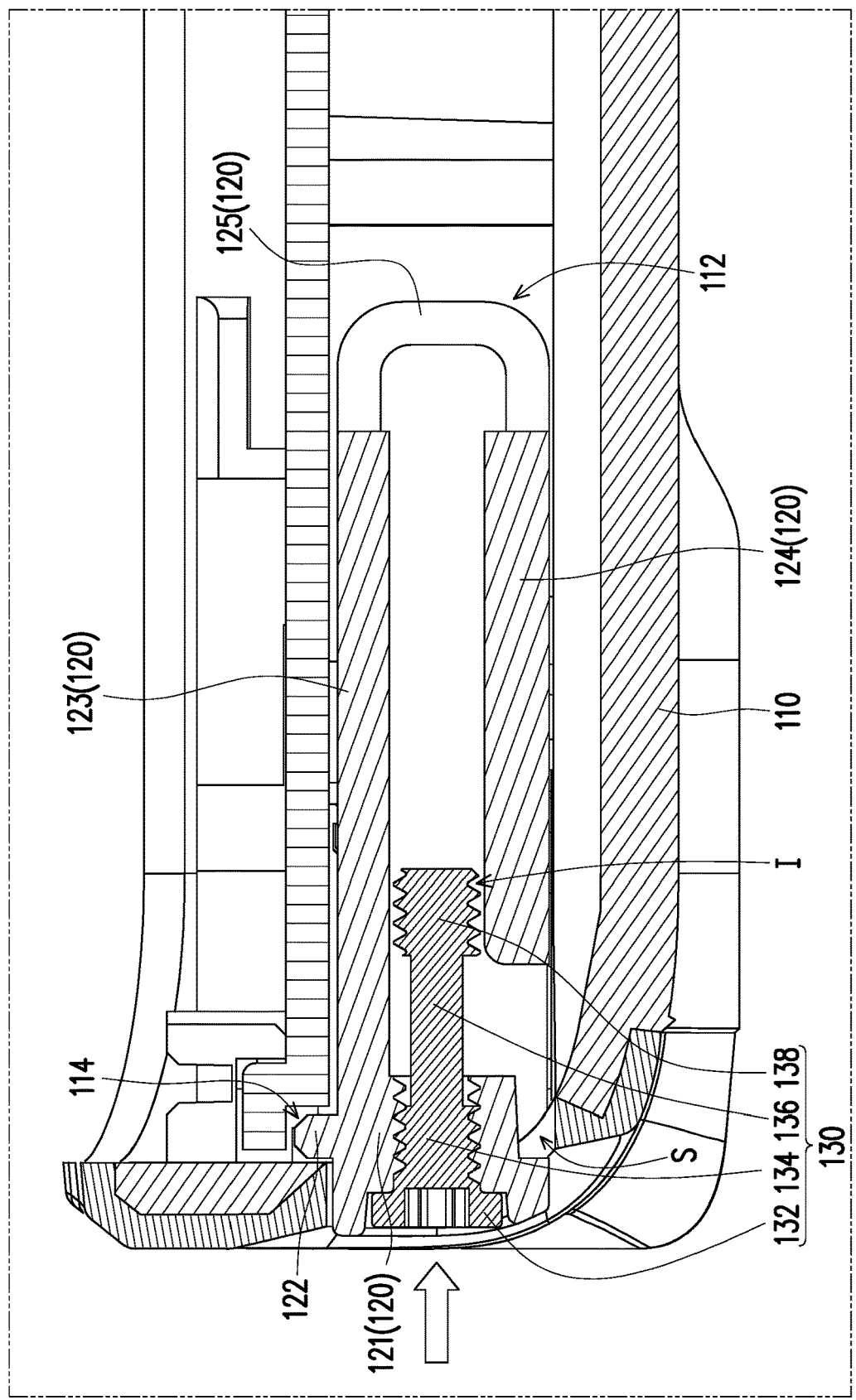
FIG. 3 is a schematic view of a locking member in FIG. 1 extending into an insertion space.

FIG. 1 is a three-dimensional schematic view of a partial cross section of an electronic device according to an embodiment of the disclosure. FIG. 2 is a schematic side view of FIG. 1. FIG. 3 is a schematic view of a locking member in FIG. 1 extending into an insertion space. It should be noted that in FIG. 1 and FIG. 2, a locking member 130 is not yet fully locked into a flexible pen plug 120, while the locking member 130 in FIG. 3 is located at a position to lock into and position the flexible pen plug 120.

Referring to FIG. 1 to FIG. 3, an electronic device 100 according to this embodiment is, for example, a laptop. According to other embodiments, the electronic device 100 may also be a tablet or other devices, and the type of the electronic device 100 is not limited thereto. The electronic device 100 according to this embodiment includes a casing 110, a flexible plug 120, and a locking member 130. The casing 110 is, for example, a casing of a lower body of a laptop, but the type of the casing 110 is not limited thereto. The casing 110 includes a pen slot 112 and a first engaging portion 114 located beside the pen slot 112. According to this embodiment, the first engaging portion 114 is, for example, a groove.

The flexible pen plug 120 is detachably disposed in the pen slot 112. According to this embodiment, a material of the flexible pen plug 120 is plastic, rubber, or silicone, and may be bent and deformed, but the material of the flexible pen plug 120 is not limited thereto.

Figure 4:
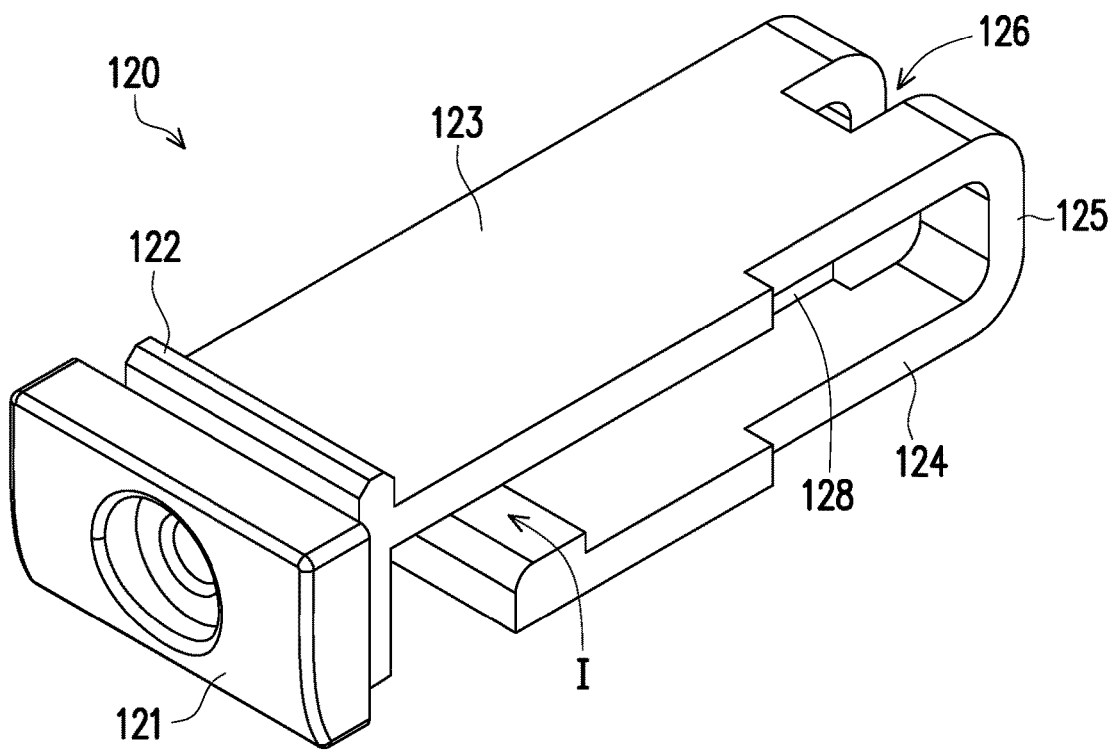
FIG. 4 and FIG. 5 are schematic views of different viewing angles of the flexible pen plug of FIG. 1.
Figure 5:
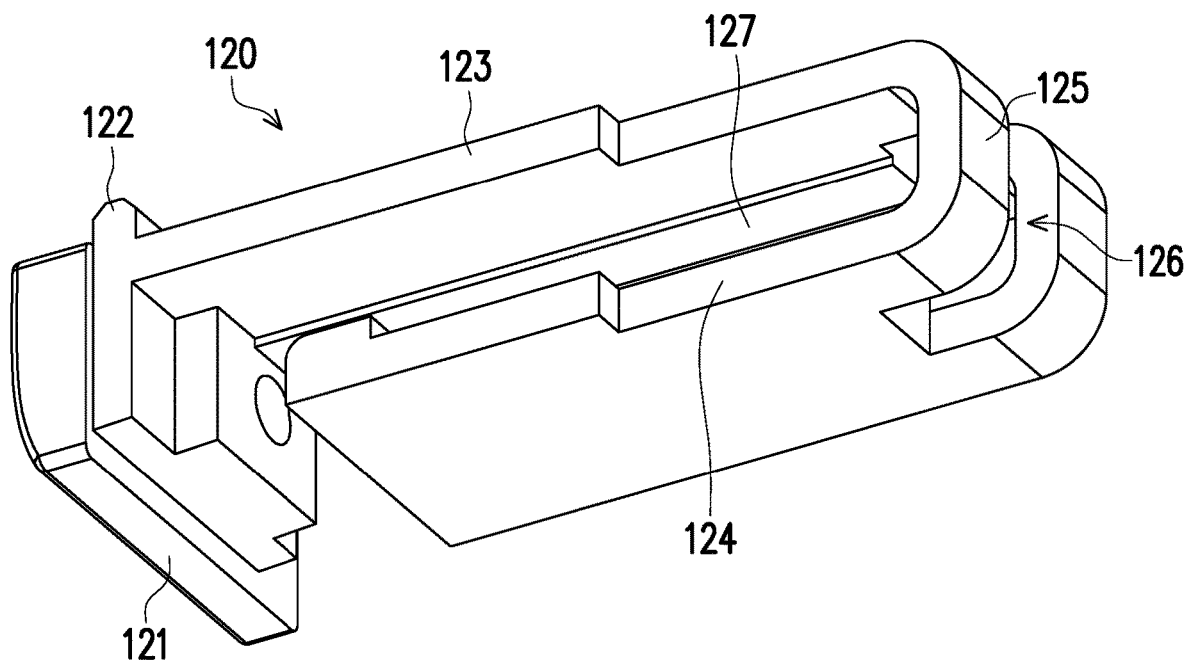

FIG. 4 and FIG. 5 are schematic views of different viewing angles of the flexible pen plug of FIG. 1. Referring to FIG. 4 and FIG. 5, the flexible pen plug 120 includes a door portion 121, a second engaging portion 122, a first wall portion 123, and a second wall portion 124. The second engaging portion 122 is connected to the door portion 121. According to this embodiment, the second engaging portion 122 is, for example, a raised bar. The first wall portion 123 is connected to the door portion 121 and is close to the second engaging portion 122. The second wall portion 124 is parallel to the first wall portion 123 and away from the second engaging portion 122. The second wall portion 124 is separated from the door portion 121, and an insertion space I is formed between the first wall portion 123 and the second wall portion 124.

In an embodiment, the flexible pen plug 120 further includes a third wall portion 125. The third wall portion 125 connects the first wall portion 123 and the second wall portion 124. The first wall portion 123, the third wall portion 125, and the second wall portion 124 are in a U-shape. The door portion 121 is close to an opening of the U-shape.

The flexible pen plug 120 includes a hardness adjustment hole 126 extending from the first wall portion 123 and the third wall portion 125 to the second wall portion 124. The hardness adjustment hole 126 may be used to adjust a hardness of the flexible pen plug 120, in particular the ability of the third wall portion 125 to deform, so that the first wall portion 123 and the second wall portion 124 may more easily approach each other when being squeezed. Of course, the location, number, and size of the hardness adjustment hole 126 may be adjusted according to requirements.

In addition, according to this embodiment, the flexible pen plug 120 includes a reinforcing rib 127 (FIG. 5) and a reinforcing rib 128 (FIG. 4), and the reinforcing rib 127 and the reinforcing rib 128 are used to increase the structural strength. Specifically, the reinforcing rib 127 protrudes from the first wall portion 123 toward the second wall portion 124, and the reinforcing rib 128 protrudes from the second wall portion 124 toward the first wall portion 123. Positions of the reinforcing rib 127 and the reinforcing rib 128 correspond, for example, to a position of the locking member 130.

In an embodiment, the design of the reinforcing rib 127 and the reinforcing rib 128 may enable the local structural strength of the flexible pen plug 120 at the first wall portion 123 and the second wall portion 124 to be increased to provide a stiffer effect at the reinforcing ribs 127 and the reinforcing rib 128. Other portions of the first wall portion 123 and the second wall portion 124 may have less structural strength and be more easily bent.

Back to FIG. 3, when the flexible pen plug 120 is disposed in the pen slot 112, the second engaging portion 122 is engaged with the first engaging portion 114. The locking member 130 is detachably screwed to the door portion 121. When the locking member 130 is screwed to the door portion 121, the locking member 130 partially extends into the insertion space I, and is located between the first wall portion 123 and the second wall portion 124, the locking member 130 has a function similar to a bolt. The locking member 130, the first wall portion 123, and the second wall portion 124 may be considered as a whole. If the locking member 130 or the flexible pen plug 120 is to be moved, the locking member 130 is limited by the first wall portion 123 and the second wall portion 124, and the first wall portion 123 and the second wall portion 124 are also limited by the locking member 130, which further limits the door portion 121 secured to the locking member 130, and maintains a relative position of the second engaging portion 122 and the first engaging portion 114.

When the flexible pen plug 120 is disposed in the pen slot 112, a receding space S is formed between the door portion 121 and the casing 110, the receding space S is away from the first engaging portion 114, and a height H1 of the receding space S is greater than or equal to a height H2 of the second engaging portion 122. To remove the flexible pen plug 120, the locking member 130 needs to be moved out of the insertion space I (i.e., to the position shown in FIG. 2), and the door portion 121 is released from the limit, and then the locking member 130 and the flexible pen plug 120 is moved down, the flexible pen plug 120 is moved into the receding space S, and the second engaging portion 122 is moved away from the first engaging portion 114, and then the flexible pen plug 120 may be pulled out of the pen slot 112.

As shown in FIG. 2, according to this embodiment, the locking member 130 includes a nut 132, a first threaded segment 134, a threadless segment 136, and a second threaded segment 138 sequentially connected to each other. The second threaded segment 138 is located at the end of the locking member 130.

According to this embodiment, a length L1 of the second threaded segment 138 is smaller than a distance L2 between the second wall portion 124 and the door portion 121. As a result, when the second threaded segment 138 of the locking member 130 is receded from the insertion space I between the first wall portion 123 and the second wall portion 124, the second threaded segment 138 of the locking member 130 may still be located behind the door portion 121 and not yet inside the door portion 121.

In this state, the threadless segment 136 of the locking member 130 is located in a screw hole of the door portion 121, an user may stop screwing when resistance of screwing the locking member 130 disappears, and the second threaded segment 138 located behind the door portion 121 may prevent the locking member 130 from detaching from the flexible pen plug 120. In a state shown in FIG. 2, the locking member 130, which is screwed out halfway, may be used as a handle or a point of application for the user to press the locking member 130 downward, and the locking member 130 drives the flexible pen plug 120 to move together to the lower receding space S, so that the second engaging portion 122 is moved away from the first engaging portion 114. The user then pulls the locking member 130 together with the flexible pen plug 120 outward (to the left of FIG. 2) to remove the flexible pen plug 120 from the pen slot 112, which is very convenient and intuitive to use.

Thus, when disassembling the flexible pen plug 120 of the electronic device 100, it is not necessary to disassemble the casing 110, and the locking member 130 does not need to be completely screwed out of the flexible pen plug 120, but only needs to be screwed to move away the insertion space I on the outside of the casing 110, and then the flexible pen plug 120 may be removed.

In addition, when the flexible pen plug 120 is to be installed in the pen slot 112, after the flexible pen plug 120 is put into the pen slot 112, the locking member 130 may be secured by simply screwing the locking member 130 into the door portion 121 until the second threaded segment 138 of the locking member 130 enters the insertion space I. This is quite convenient in operation. The combination of the flexible pen plug 120 and the locking member 130 according to this embodiment has a strong fixity and convenience.

Figure 6:
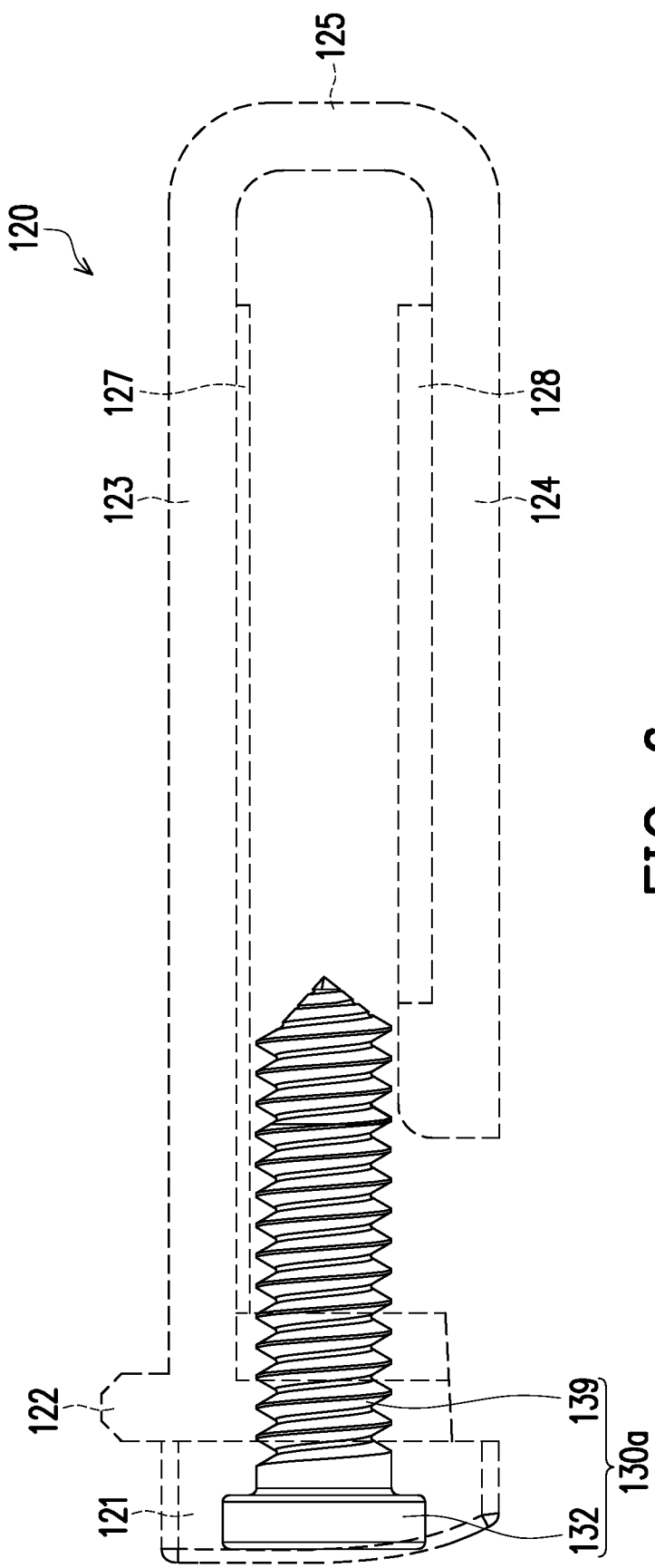
FIG. 6 is a schematic view of a locking member according to another embodiment of the disclosure.

FIG. 6 is a schematic view of a locking member according to another embodiment of the disclosure Referring to FIG. 6, according to this embodiment, a locking member 130a may be a self-tapping screw. That is, an end of the locking member 130a may be pointed. The door portion 121 of the flexible pen plug 120 may not have a screw hole at first, and the screw hole is created during screwing of the locking member 130 into the door portion 121. This design allows the door portion 121 to be produced more conveniently without the need for providing with internal threads in advance. In addition, according to this embodiment, the locking member 130a may also not have the threadless segment 136, i.e., the locking member 130a may also be a combination of the nut 132 and the threaded segment 139.

In an embodiment, the user may also first screw out the locking member 130a to half, use the locking member 130a, which is screwed out halfway, as a handle or a point of application for the user, and then press the lock member 130a downward to drive the flexible pen plug 120 to move together to the receding space S and be pulled out of the pen slot 112. That is, the locking member 130a may be operated in the same way as the locking member 130, which is quite convenient.

To sum up, the flexible pen plug of the electronic device of the disclosure is detachably disposed in the pen slot, and the locking member is detachably screwed to the door portion of the flexible pen plug. When the flexible pen plug is disposed in the pen slot, the second engaging portion of the flexible pen plug is engaged with the first engaging portion of the casing. When the locking member is screwed to the door portion, the locking member partially extends into the insertion space, and is located between the first wall portion and the second wall portion, the locking member is limited by the second wall portion, and thus the door portion secured to the locking member is limited, so that the relative position between the second engaging portion and the first engaging portion is maintained. When the locking member is moved out of the insertion space, the door portion is released from the limit, and the second engaging portion is adapted to be released from the first engaging portion. Thus, compared with the conventional pen plug which is only fastened to the pen slot, the flexible pen plug of the disclosure is limited by the locking member and does not easily fall out of the pen plug. In addition, compared with the conventional method of securing the pen plug with screws from the inside of the device, the locking member of the disclosure is secured to the door portion of the flexible pen plug from the outside of the casing, and the user may easily adjust the locking member to easily disassemble the flexible pen plug.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. An electronic device comprising:
   a casing comprising a pen slot and a first engaging portion located beside the pen slot;
   a flexible pen plug detachably disposed in the pen slot, including a door portion, a second engaging portion connected to the door portion, a first wall portion close to the second engaging portion, and a second wall portion away from the second engaging portion, wherein an insertion space is formed between the first wall portion and the second wall portion, and when the flexible pen plug is disposed in the pen slot, the second engaging portion is engaged with the first engaging portion; and
   a locking member detachably screwed to the door portion, wherein when the locking member is screwed to the door portion, the locking member partially extends into the insertion space, and is located between the first wall portion and the second wall portion, the locking member is limited by the second wall portion, and thus the door portion secured to the locking member is limited, such that a relative position between the second engaging portion and the first engaging portion is maintained, when the locking member is moved out of the insertion space, the door portion is released from the limit, and the second engaging portion is adapted to be released from the first engaging portion.

2. The electronic device according to claim 1, wherein the first wall portion is connected to the door portion, and the second wall portion is separated from the door portion.

3. The electronic device according to claim 1, wherein the flexible pen plug further comprises a third wall portion connecting the first wall portion and the second wall portion, the first wall portion, the third wall portion, and the second wall portion are in a U-shape, and the door portion is close to an opening of the U-shape.

4. The electronic device according to claim 1, wherein the flexible pen plug comprises a hardness adjustment hole.

5. The electronic device according to claim 1, wherein the second wall portion comprises a reinforcing rib protruding toward the first wall portion.

6. The electronic device according to claim 1, wherein the locking member is a self-tapping screw.

7. The electronic device according to claim 1, wherein the locking member comprises a nut, a first threaded segment, a threadless segment, and a second threaded segment sequentially connected to each other, and a length of the second threaded segment is less than a distance between the second wall portion and the door portion.

8. The electronic device according to claim 1, wherein when the flexible pen plug is disposed in the pen slot, a receding space is formed between the door portion and the casing, the receding space is away from the first engaging portion, and a height of the receding space is greater than or equal to a height of the second engaging portion.

9. A flexible pen plug adapted to be inserted into a pen slot, a first engaging portion located beside the pen slot, wherein the flexible pen plug comprises:
   a door portion;
   a second engaging portion connected to the door portion;
   a first wall portion connected to the door portion and close to the second engaging portion;
   a second wall portion parallel to the first wall portion and away from the second engaging portion, the second wall portion is separated from the door portion, wherein an insertion space is formed between the first wall portion and the second wall portion; and
   a third wall portion, connecting the first wall portion and the second wall portion, the first wall portion, the third wall portion, and the second wall portion are in a U-shape, and the door portion is close to an opening of the U-shape.

10. A flexible pen plug adapted to be inserted into a pen slot, a first engaging portion located beside the pen slot, wherein the flexible pen plug comprises:
   a door portion;
   a second engaging portion connected to the door portion;
   a first wall portion connected to the door portion and close to the second engaging portion; and
   a second wall portion parallel to the first wall portion and away from the second engaging portion, the second wall portion is separated from the door portion, wherein an insertion space is formed between the first wall portion and the second wall portion,
   a locking member is adapted to partially extend into the insertion space through the door portion.

* * * * *